United States Patent [19]

Johnston

[11] 4,029,480
[45] June 14, 1977

[54] HYDROCARBON FUEL COMPOSITIONS CONTAINING POLYSULFONE ANTISTATIC ADDITIVES

[75] Inventor: Thomas E. Johnston, Wilmington, Del.

[73] Assignee: E. I. Du Pont de Nemours and Company, Wilmington, Del.

[22] Filed: Aug. 5, 1975

[21] Appl. No.: 602,092

Related U.S. Application Data

[63] Continuation-in-part of Ser. No. 268,048, June 30, 1972, abandoned.

[52] U.S. Cl. .................................. 44/62; 44/76
[51] Int. Cl.² ............................................ C10L 1/24
[58] Field of Search ......................... 44/62, 76

[56] References Cited

UNITED STATES PATENTS

| 3,442,790 | 5/1969 | Burkard et al. | 44/62 |
| 3,820,963 | 6/1974 | Moore et al. | 44/62 |

FOREIGN PATENTS OR APPLICATIONS

| 605,205 | 9/1960 | Canada | 44/62 |

Primary Examiner—Allen B. Curtis
Assistant Examiner—Mrs. Y. Harris-Smith
Attorney, Agent, or Firm—James A. Costello

[57] ABSTRACT

Electrically conductive hydrocarbon fuel compositions containing from 0.01 to 40 ppm of an antistatic polysulfone copolymer additive consisting essentially of units derived from sulfur dioxide, $C_{6-24}$ 1-alkene and, optionally, an olefin of the formula

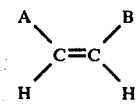

wherein A is a group having the formula, $-(C_xH_{2x})-COOH$, where $x$ is from 0 to 17, and B is hydrogen or carboxyl; and a process for preparing same.

5 Claims, No Drawings

HYDROCARBON FUEL COMPOSITIONS CONTAINING POLYSULFONE ANTISTATIC ADDITIVES

CROSS-REFERENCE TO RELATED APPLICATION

This is a continuation-in-part application of copending application bearing U.S. Ser. No. 268,048, filed on June 30, 1972, now abandoned.

BACKGROUND OF THE INVENTION

1. Field of the Invention

This invention concerns novel electrically conductive hydrocarbon fuel compositions prepared by admixing a hydrocarbon fuel with from 0.01 to 40 ppm of a polysulfone copolymer.

2. Description of the Prior Art

The accumulation of electrical charges in the handling of hydrocarbon fuels is widely recognized in the art as a serious hazard. Spark discharge over flammable fuels because of the accumulation of static electrical charge in the fuels has been considered responsible for numerous explosions and fires. Since the hydrocarbon fuels are normally very poor conductors of electricity, the charge in the fuel is not rapidly dissipated and, where such accumulation of electrical charge reaches a sufficiently high level, the electrical energy is discharged as sparks which can ignite hydrocarbon vapors present in admixture with the air. The most practical approach to overcome the problem is use of a conductivity aid (antistatic additive) in the fuels.

It is recognized in the art that an antistatic additive must not only increase the electrical conductivity of the substrate fuel but should also maintain the increased conductivity over a sufficiently long period of time to allow for transportation and storage of fuels; be resistant to removal from the fuel when brought into contact with water; and should not affect the ability of the fuel to separate from water. The art-known antistatic additives are deficient in one or more of these requirements.

SUMMARY OF THE INVENTION

This invention is directed to electrically conductive hydrocarbon fuel compositions comprising a normally liquid hydrocarbon fuel containing from 0.01 to 40 ppm of an antistatic polysulfone copolymer additive having an average molecular weight between 10,000 to 900,000, consisting essentially of about 50 mol percent of units derived from sulfur dioxide, from about 40 to 50 mol percent of units derived from at least one 1-alkene of 6 to 24 carbon atoms and from 0 to about 10 mol percent of units derived from an olefin having the formula

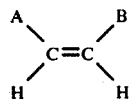

wherein A is a group having the formula, $-(C_xH_{2x})-COOH$, where $x$ is from 0 to 17, and B is hydrogen or carboxyl, with the proviso that when B is carboxyl, $x$ is 0, and A and B together can be a dicarboxylic anhydride group.

A preferred concentration of additive in the fuel is between 1 to 20 ppm and an especially preferred concentration is between 4 to 10 ppm. All of the compositions of this invention are characterized in that (1) they exhibit very good electrical conductivity for prolonged periods of time, (2) they are resistant to the removal of the antistatic additive in the presence of moisture, (3) they separate readily from water.

The process of this invention concerns rendering normally liquid hydrocarbon fuels electrically conductive by admixing with a normally liquid hydrocarbon fuel from 0.01 to 40 ppm of the described antistatic polysulfone copolymer.

DETAILS OF THE INVENTION

The polysulfone copolymers, sometimes designated as olefin-sulfur dioxide copolymers, olefin polysulfones, or poly(olefin sulfone) are linear polymers whose structure is considered to be that of alternating copolymers of the olefins and sulfur dioxide, having a one-to-one molar ratio of the comonomers with the olefins in head to tail arrangement.

The contemplated polysulfones are prepared by methods known in the art (cf. Encyclopedia of Polymer Science and Technology Vol. 9, Interscience Publishers, page 460 et seq.). The reaction leading to polysulfone formation is a free radical polymerization process. Radical initiators effective in initiating polysulfone formation include oxygen, ozonides, peroxides, hydrogen peroxide, ascaridole, cumene peroxide, benzoyl peroxide, and azobisisobutyronitrile. Polysulfone formation can also be initiated by irradiation with visible light.

While polysulfones prepared by any of the methods of the art are useful in the present invention, the preferred product is that prepared by ultra-violet light induced polymerization of 1-alkene and sulfur dioxide in the presence of azobisisobutyronitrile in a solvent such as toluene with a small amount of dodecyl mercaptan (from about 0.002 to 0.03 mole per mole of olefin) as a molecular weight modifier.

The weight average molecular weight of the polysulfones useful in this invention is in the range from about 10,000 to 900,000. The preferred range is from about 50,000 to 700,000 and the most preferred range is from about 100,000 to 500,000. Olefin polysulfones whose molecular weights are below about 10,000, while effective in increasing conductivity in hydrocarbon fuels, do not increase the conductivity values enough. Olefin polysulfones whose molecular weights are above about 900,000 are difficult to produce and to handle. The molecular weights of the olefin polysulfones can be determined by well-known methods such as the light-scattering method.

It is convenient to determine the inherent viscosity of the polymer to derive the approximate molecular weight range of the polysulfones therefrom. Inherent viscosity is defined as $\eta_{inh.} = 1n._{\eta\ rel}/C$ wherein $1n$ is the natural logarithm, $\eta$ rel is a relative viscosity, i.e. ratio of the viscosity of the polymer solution to the viscosity of the polymer solvent and C is concentration of polymer in g/100 ml. The units of inherent viscosity are deciliters per gm. The inherent viscosities of olefin polysulfones are conveniently measured in toluene at 30° C as 0.5 weight percent solutions. It has been found by comparison with molecular weight determinations that olefin polysulfones with inherent viscosities of between about 0.1 dl/g to about 1.6 dl/g correspond to weight average molecular weights in the range of about 50,000 to about 900,000.

The control of the molecular weights of the olefin polysulfones is readily accomplished by those skilled in the art of polymer science by controlling the polymerization conditions such as the amount of initiator used, polymerization temperature, etc., or by using molecular weight modifiers. The amount of molecular weight modifier required to obtain polymers having particular molecular weights will depend upon the 1-olefin being copolymerized with sulfur dioxide. However, the requisite amount can be readily determined with few experiments. Generally, the amount of modifier, such as dodecyl mercaptan, used to obtain polymers having molecular weights of 50,000 to 900,000 will range up to about 0.007 mole per mole of 1-olefin.

The useful 1-alkenes include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonodecene, 1-eicosene, 1-heneicosene, 1-docosene, 1-tricosene and 1-tetracosene. While the normal straight chain 1-alkenes are preferred, 1-alkenes containing branched chains are also useful. A mixture of 1-alkenes can be used and use thereof is desirable if obtainable at a lower cost than pure olefins.

The olefin portion of the polysulfone should be an olefin of at least 6 carbon atoms to insure that the polysulfone is sufficiently soluble in hydrocarbons. For practical and economic reasons, the olefin used for the preparation of polysulfone should have no more than about 24 carbon atoms. The preferred olefins will have from about 8 to 12 carbon atoms, the most preferred olefin will have 10 carbon atoms, i.e. 1-decene.

The polysulfones may contain up to 10 mol percent of the olefin, $C(A)(H) = C(B)(H)$, heretofore described. When maleic anhydride is copolymerized with a 1-olefin and sulfur dioxide, the resulting copolymer will contain the dicarboxylic anhydride group. The dicarboxylic anhydride group in the polymer is readily converted to two carboxyl groups by simple acid hydrolysis.

When B in the olefin formula is hydrogen, the olefin will be a terminally unsaturated alkenoic acid represented by $CH_2=CH-(C_xH_{2x})-COOH$. The alkylene group bridging the vinyl and the carboxyl groups, if present, will have from 1 to 17 carbon atoms and may be straight chain or branched chain.

The useful acids are alkenoic acids of 3 to 20 carbon atoms wherein the olefinic group is a terminal group. Representative alkenoic acids include acrylic acid, 3-butenoic acid, 4-pentenoic acid, 5-hexenoic acid, 6-heptenoic acid, 7-octenoic acid, 8-nonenoic acid, 9-decenoic acid, 10-undecenoic acid, 11-dodecenoic acid, 13-tetradecenoic acid, 15-hexadecenoic acid, 17-octadecenoic acid as well as branched chain alkenoic acids with terminal olefinic groups such as 2-ethyl-4-pentenoic acid, 2,2-dimethyl-4-pentenoic acid, 3-ethyl-6-heptenoic acid, 2-ethyl-6-heptenoic acid, 2,2-dimethyl-6-heptenoic acid and the like. A mixture of alkenoic acids can be used.

The normally liquid hydrocarbon fuels to which the olefin polysulfones are added are those boiling in the range of from about 70° F to 700° F. The fuels include such commonly designated fuels as aviation gasolines, motor gasolines, jet fuels, naphtha, kerosenes, diesel fuels, and distillate fuel oils. The amount of olefin polysulfone used will depend upon the particular hydrocarbon fuel and the desired level of conductivity. It is recognized in the art that the electrical conductivity of a liquid hydrocarbon varies depending upon the particular source of the hydrocarbon and its processing history.

Usually, the hydrocarbon fuels in the gasoline boiling range have very low conductivities (0–10 picomhos/meter) while those in the fuel oil range have somewhat higher conductivities (20–30 picomhos/meter). It is also recognized that the response of hydrocarbon fuels to conductivity-increasing additives may vary unpredictably. In responsive fuels, the olefin polysulfones at 1 to 10 parts per million are sufficient to give increased conductivities whereas in poorly responsive fuels, the olefin polysulfones are used in amounts greater than 10 parts per million.

It should be noted that the conductivities referred to in the above discussion are the initial conductivities. A totally unexpected feature of the present invention is that when olefin polysulfones are used as conductivity-increasing additives, the conductivities of hydrocarbon fuels so treated increase with the passage of time so that, in responsive fuels, such as fuel oils, the conductivities after 6 weeks can be from about 20% to 760% greater than the initial conductivities. Even in poorly responsive fuels, such as jet fuels, the conductivities after 6 weeks can be from about 5% to 200% greater than the initial conductivities.

In spite of prior art teachings that effective conductivity increasing additives for hydrocarbon fuels should be ionic or ionogenic compounds, it was found that the olefin polysulfones of this invention are effective conductivity increasing compounds for hydrocarbon fuels. The olefin polysulfones of the invention wherein the components of the copolymer are sulfur dioxide and 1-olefin are nonionic and nonionogenic.

The olefin polysulfones which contain the second olefin are considered to be ionogenic because of the presence of the carboxyl group or the dicarboxylic anhydride group. However, as the Examples clearly indicate, approximately the same degree of increased conductivity is obtained with olefin polysulfones regardless of the presence or absence of the second olefin.

It is expected that the olefin polysulfone will enhance the electrical conductivity of hydrocarbon liquids when used in conjunction with other additives such as metal organic compounds wherein the metal ions are held principally by negatively charged organic anions, and certain quaternary ammonium compounds.

The olefin polysulfones can be admixed with the hydrocarbon fuels in any convenient manner. The copolymer can added to the hydrocarbon and the mixture stirred until the polymer is dissolved or the olefin polysulfone can be added as a solution in a solvent such as benzene, toluene or xylenes, and stirred to obtain a uniform distribution.

The concentrations of the olefin polysulfones in solvents can be in the range of from about 10 percent to 40 percent by weight. The hydrocarbon fuel compositions containing a described antistatic additive can also contain conventional additives used in hydrocarbon fuels such as anti-knock compounds, antioxidants, corrosion inhibitors, metal deactivators, rust preventatives, dyes, anti-icing agents and the like.

PREPARATIONS AND EXAMPLES

The Examples are intended to illustrate the invention and not to limit the invention. Unless otherwise indicated, all quantities are by weight.

PREPARATION 1

This is a description of the preparation of 1-decene polysulfone. A 3 liter resin flask equipped with a stirrer, a reflux condenser, a thermometer and a gas inlet tube was swept with dry nitrogen. To the flask were added 400 g 1-decene, 1430g. toluene and 2.8g. dodecyl mercaptan. The contents of the flask were a solution which was cooled to between 5° C. and 10° C. and 200g. of sulfur dioxide was passed into the solution. Azobisisobutyronitrile, 2.8g., was then added and a mercury arc lamp was used to irradiate the solution. The stirred charge was kept at from 5° C. to 15° C. with the sulfur dioxide being added continuously at such a rate that it was always in excess. At intervals of 4, 8, 12, and 16 hours additional 1.4g portions of azobisisobutyronitrile were added. After a total of 20 hours of irradiation, the mercury lamp was turned off, the addition of sulfur dioxide was stopped, and nitrogen gas was passed into the viscous solution to remove excess sulfur dioxide.

After the removal of the sulfur dioxide, a clear viscous solution weighing 1820 g was obtained. A weighed portion of the solution was removed and upon removal of toluene and unreacted 1-decene by evaporation in a rotary vacuum evaporator, 1-decene-polysulfone was obtained. The yield of 1-decene polysulfone based on the above-isolated polymer was 279 g (82%). The 1-decene-polysulfone had an inherent viscosity of 0.36 measured as a 0.5% solution in toluene at 30° C. The weight average molecular weight of the polymer as determined by the light scattering method was 400,000.

PREPARATIONS 2 TO 17

Using the same procedure as described in Preparation 1, other 1-olefin polysulfones were prepared. Some of the 1-olefin polysulfones with their inherent viscosities (measured in toluene at 30° C as 0.5% solution) are summarized below.

| Preparation | Olefin Used | Inherent Viscosity |
|---|---|---|
| 2 | 1-hexene | 0.97 |
| 3 | 1-octene | 0.21 |
| 4 | 1-octene | 0.29 |
| 5 | 1-octene | 0.45 |
| 6 | 1-octene | 0.87 |
| 7 | 1-decene | 0.14 |
| 8 | 1-decene | 0.14 |
| 9 | 1-decene | 0.58 |
| 10 | 1-decene | 0.90 |
| 11 | 1-decene | 1.24 |
| 12 | 1-decene | 1.40 |
| 13 | 1-decene | 1.46 |
| 14 | 1-decene | 1.57 |
| 15 | 1-dodecene | 0.39 |
| 16 | 1-hexadecene | 0.86 |
| 17 | 1-octene/octadecene (10/1) | 0.70 |

PREPARATION 18

This is a description of the preparation of a polysulfone containing 50 mol percent of sulfur dioxide, 45.5 mol percent of 1-decene and 4.5 mol percent of maleic anhydride. A 1-liter resin flask equipped as described in Preparation 1 was charged with 140g. 1-decene, 10g. maleic anhydride, 1g, dodecyl mercaptan and 300g. toluene. The contents of the flask were a solution which was cooled to between 5° C. and 10° C. and 80g. of sulfur dioxide was passed into the solution. Azobisisobutyronitrile, 1g., was then added and a mercury arc lamp was used to irradiate the solution. The stirred charge was kept at 5° C.–10° C. with sulfur dioxide being added continuously at such a rate that it was always in excess. At intervals of 4, 8, 12, and 16 hours, additional 0.5g. portions of azobisisobutyronitrile were added. After 20 hours of irradiation, the mercury arc lamp was turned off, and the addition of sulfur dioxide stopped.

The excess sulfur dioxide was removed by passing nitrogen into the viscous solution. A 20 g portion of this solution was dried to give 7.1 g of the polymer. The total solution therefore contained 165 g (77.5% yield) of the polymer. The inherent viscosity of the polymer was 0.68. The presence of maleic anhydride in the polymer was demonstrated by infrared spectroscopy. By using the same procedure as described above two additional copolymers were prepared, 1-decene-maleic anhydride-sulfur dioxide copolymer containing in one instance 47.6 mol percent 1-decene, 2.4 mole percent maleic anhydride and 50 mol percent sulfur dioxide and in the second instance 41.7 mol percent 1-decene, 8.3 mol percent maleic anhydride and 50 mol percent sulfur dioxide.

PREPARATION 19

Using the same procedure as described in Preparation 18 a polysulfone containing 50 mol percent of sulfur dioxide, 47.6 mol percent of 1-decene and 2.4 mol percent of allylacetic acid (4-pentenoic acid) was prepared having a molecular weight between 10,000–900,000.

PREPARATION 20

Using the same procedure as described in Preparation 18 a polysulfone containing 50 percent of sulfur dioxide, 47.6 mol percent of 1-decene and 2.4 mol percent of 10-undecenoic acid was prepared having a molecular weight between 10,000–900,000.

EXAMPLES 1 TO 8

These Examples show the increased conductivities obtained in fuel oil when a very small amount of an olefin polysulfone according to the invention as exemplified by 1-decene polysulfone is added thereto. These Examples also show that with the olefin polysulfone as antistatic additive, the conductivity of the composition increases with time. The conductivity measurements were made with a Maihak Conductivity Indicator (H. Maihak A. G., Hamburg, Germany). In operation the device imposes a potential of 6 volts of direct current on a pair of chromium plated electrodes immersed in the fluid to be tested. The current resulting from this potential, which is of the order of $10^{-9}$ to $10^{-8}$ ampere, is amplified and used to actuate a dial calibrated in conductivity units (C.U.). A conductivity unit is 1 picomho/meter. The test samples were stored in metal containers at room temperature. The results are shown in Table 1.

TABLE 1

Fuel Oil Conductivities

| Example No. or Comparison Letter | Fuel Oil (base C.U.) | Fuel Source | Additive | Conc. (ppm) | Conductivity(C.U.) Initial | Conductivity(C.U.) 10 Days |
|---|---|---|---|---|---|---|
| 1 | Kerosene (0) | Unknown | 1-Decene Polysulfone (of Preparation 1) | 12 | 75 | 170 |
| 2 | No. 2, Straight Run(20) | BP-Canada | same | 2.4 | 230 | 265 |
| 3 | No.2, Hydrocracked(10) | BP-Canada | same | 12 | 215 | 339 |
| 4 | No.2 (20) | Union-Illinois | same | 8 | 225 | 369 |
| 5 | No.2 (15) | Shell-Illinois | same | 5.2 | 230 | 830 |
| 6 | No.2, Blend (10) | Sun-Oklahoma | same | 18 | 125 | 155 |
| 7 | No.2, Blend (40) | Texaco-Oklahoma | same | 2.4 | 230 | 390 |
| 8 | No.2, Light Cycle(50) | Sun-Pennsylvania | same | 1.8 | 235 | 485 |
| A | Kerosene (20) | Unknown | di-n-propylsulfone | 4 | 20 | 25 |
| B | Kerosene (20) | Unknown | tetramethylenesulfone | 4 | 25 | 25 |

The data of Table 1 clearly demonstrate that the olefin polysulfone utilized according to the invention is very effective in increasing the conductivity of fuel oils, even when present in very small amounts. The data also show that the conductivity of fuel oils treated with a polysulfone according to the invention increases with time and that essentially no increase in conductivity is obtained when monomeric sulfone, as exemplified by di-n-propyl sulfone and tetramethylene sulfone, is used in fuel oil (kerosene) and also that no sulfone, is used in fuel oil (kerosene) and also that no increase is found with time in that instance. Similar results of increased initial conductivity and increase in conductivity with time will be obtained with olefin polysulfones of Preparations 2 to 18.

EXAMPLES 9 TO 18

This Example shows the increased electrical conductivity of fuel oils and Diesel fuels treated with a polysulfone according to the invention (the 1-decene polysulfone of Preparation 1). This Example also shows the unexpected increase in the conductivities of the treated fuels with time. The tests were carried out by treating the fuels with the polysulfones to obtain fuel conductivity of (a) 50 Conductivity Units (C.U.) or (b) about 200 Conductivity Units or (c) the limitation in the treating level of 10 pounds per thousand barrels, (i.e. 40 ppm) regardless of the conductivity value obtained. For comparative purposes, data for two commercially available antistatic additives, designated C and D are also included. Commercial Additive C is a mixture of chromium salt of mono and dialkyl salicylic acid, calcium dodecylsulfosuccinate and a basic polymer while Commercial Additive D is a polymeric amine salt.

The conductivity values were determined with a Maihak Conductivity Indicator as described previously. The test samples were stored in metal containers at room temperature and the cnductivities were determined at stated intervals. The results are shown in Table 2. Conductivity values beside the designation of the fuel represent the conductivity of said fuel without the additive of this invention.

TABLE 2

Fuel Oil Conductivity

| Example No. | Additive | Concentration lb/1000 bbl | ppm | Initial | Conductivity (C.U.) 1 Week | 3 Weeks | 6 Weeks | % Changed at 6 Weeks |
|---|---|---|---|---|---|---|---|---|
| | | Fuel A, No. 2 Fuel Oil (C.U. = 20) | | | | | | |
| 9 | of Preparation 1 | 5.0 | 20 | 195 | 310 | 190 | 225 | +31 |
| | Commercial Additive C | 1.0 | 4 | 205 | 260 | 220 | 220 | +7 |
| | Commercial Additive D | 0.5 | 2 | 180 | 130 | 70 | 80 | −56 |
| | | Fuel B, No. 2 Diesel Fuel (C.U. = 0) | | | | | | |
| 10 | of Preparation 1 | 10.0 | 40 | 140 | 285 | 410 | 570 | +330 |
| | Commercial Additive C | 3.0 | 12 | 230 | 300 | 310 | 340 | +48 |
| | Commercial Additive D | 9.0 | 36 | 200 | 210 | 190 | 225 | +13 |
| | | Fuel C, No. 2 Diesel Fuel (C.U. = 0) | | | | | | |
| 11 | of Preparation 1 | 10.0 | 40 | 35 | 140 | 175 | 300 | +760 |
| | Commercial Additive C | 1.25 | 5 | 205 | 280 | 225 | 250 | +22 |
| | Commercial Additive D | 7.0 | 28 | 205 | 210 | 200 | 240 | +17 |
| | | Fuel D, No. 2 Fuel Oil (C.U. = 10) | | | | | | |
| 12 | of Preparation 1 | 10.0 | 40 | 100 | 145 | 165 | 275 | +175 |
| | Commercial Additive C | 1.5 | 6 | 220 | 160 | 165 | 190 | −14 |
| | Commercial Additive D | 5.0 | 20 | 200 | 95 | 60 | 80 | −60 |
| | | Fuel E, No. 2 Fuel Oil (C.U. = 0) | | | | | | |
| 13 | of Preparation 1 | 10.0 | 40 | 30 | 140 | 140 | 210 | +600 |
| | Commercial Additive C | 1.0 | 4 | 190 | 165 | 160 | 190 | 0 |
| | Commercial Additive D | 10.0 | 40 | 190 | 175 | 140 | 180 | −5 |
| | | Fuel F, No. 1 Fuel Oil (C.U. = 30) | | | | | | |
| 14 | of Preparation 1 | 0.75 | 3 | 200 | — | 210 | 240 | +20 |
| | Commercial Additive C | 0.5 | 2 | 215 | — | 200 | 140 | −35 |
| | Commercial Additive D | 0.25 | 1 | 215 | — | 90 | 55 | −74 |
| | | Fuel G, No. 2 Diesel Fuel (C.U. = 30) | | | | | | |
| | of Preparation 1 | 6.0 | 24 | 50 | — | — | 370 | +640 |
| | Commercial Additive C | 0.25 | 1 | 50 | — | — | 200 | +300 |
| | Commercial Additive D | 1.0 | 4 | 50 | — | — | 190 | +280 |
| | | Fuel H, No. 2 Fuel Oil (C.U. = 15) | | | | | | |
| 16 | of Preparation 1 | 1.5 | 6 | 50 | — | — | 365 | +630 |

TABLE 2-continued

| | | Fuel Oil Conductivity | | | | | | |
|---|---|---|---|---|---|---|---|---|
| | | Concentration | | | Conductivity (C.U.) | | | % Changed |
| Example No. | Additive | lb/1000 bbl | ppm | Initial | 1 Week | 3 Weeks | 6 Weeks | at 6 Weeks |
| | Commercial Additive C | 0.25 | 1 | 50 | — | — | 120 | +140 |
| | Commercial Additive D | 0.75 | 3 | 55 | — | — | 150 | +173 |
| | Fuel I, No. 2 Fuel Oil (C.U. = 0) | | | | | | | |
| 17 | of Preparation 1 | 6.0 | 24 | 200 | 365 | 440 | 720 | +260 |
| | Commercial Additive C | 1.0 | 4 | 195 | 270 | 255 | 265 | +36 |
| | Commercial Additive D | 2.5 | 10 | 190 | 210 | 155 | 215 | +13 |
| | Fuel J, No. 2 Fuel Oil (C.U. = O) | | | | | | | |
| 18 | of Preparation 1 | 5.0 | 20 | 170 | 240 | 310 | 455 | +168 |
| | Commercial Additive C | 1.5 | 6 | 280 | 125 | — | 90 | −68 |
| | Commercial Additive D | 5.0 | 20 | 190 | 220 | — | 360 | +90 |

The data in Table 2 demonstrate the variability in response of fuels to antistatic additives. These data show that the polysulfones of the invention are effective in increasing electrical conductivity of fuel oils and Diesel fuels and that the conductivities of fuels so treated continue to increase with time. Each of the 10 fuels treated with the polysulfone of Preparation 1 increased in conductivity with time whereas in the fuels treated with either Commercial Additive C or Commercial Additive D, the conductivities of the fuels in most instances either remained about the same or decreased. It should be noted that increases in conductivity exhibited by the polysulfone of the invention are of a different order of magnitude than those shown by the Commercial Additives. The difference in the order of magnitude is clearly shown by comparing the figures in the last column of this table ("% change at 6 weeks").

EXAMPLES 19 TO 21

These Examples show the increased electrical conductivities in jet fuels when a small amount of a polysulfone of the invention is dissolved therein. The conductivity measurements were carried out as described previously. The test samples were stored in metal containers at room temperature and the conductivities were determined at stated intervals. The results are shown in Table 3.

TABLE 3

| | | Jet Fuel Conductivity | | | | | |
|---|---|---|---|---|---|---|---|
| | Olefin Polysulfone of Preparation 1 | | | Conductivity (C.U.) | | | % Changed |
| Example No. | Conc. lb/1000 bbl | ppm | Initial | 1 Week | 3 Weeks | 6 Weeks | at 6 Weeks |
| | Fuel: JP-4 (C.U. = 10) | | | | | | |
| 19 | 0.25 | 1 | 260 | 320 | — | 450 | +73 |
| | Fuel: JP-5 (C.U. = 10) | | | | | | |
| 20 | 2.75 | 11 | 190 | 365 | — | 200 | +5 |
| | Fuel: Turbine Fuel (C.U. = 10) | | | | | | |
| 21 | 8 | 32 | 50 | — | 70 | 70 | +40 |

The data of Table 3 also show the variability in response of the hydrocarbon fuels to antistatic additives. It should also be noted, by comparison with the previous Examples, that the response of jet fuels to the olefin polysulfone antistatic agent is less than that shown by burner oils and diesel fuels. The above data, however, clearly demonstrate increased electrical conductivity in jet fuels when olefin polysulfone is added to such fuels and (similarly to the burner oil and diesel fuels) the electrical conductivity of jet fuels so treated generally increase with time.

EXAMPLES 22 TO 25

These Examples show that olefin polysulfones having widely ranging molecular weights (as indicated by inherent viscosities) are effective conductivity increasing additives. 1-Decene polysulfones with inherent viscosities of from 0.16 to 2.14 were added to a jet fuel (base conductivity = 0) at a concentration of 4 ppm. Conductivity measurements were carried out as previously described with a Maihak Conductivity Indicator. The test samples were stored in metal containers at room temperature and conductivity determinations were made at stated intervals. The results are shown in the Table 4.

TABLE 4

| | Jet Fuel Conductivity | | | | |
|---|---|---|---|---|---|
| | 1-Decene Polysulfone of Different Molecular Weights | | | | |
| Example No. | Inherent Viscosity of Polysulfone | Conc. (ppm) | Conductivity (in C.U.) | | |
| | | | Initial | 4 Days | 20 Days |
| | (base fuel) | — | 0 | 0 | 0 |
| 22 | 0.16 | 4 | 10 | 20 | 30 |
| 23 | 0.90 | 4 | 10 | 40 | 30 |
| 24 | 1.24 | 4 | 20 | 65 | 70 |
| 25 | 1.40 | 4 | 25 | 130 | 115 |

EXAMPLES 26 TO 33

These Examples show increased conductivity in fuels containing polysulfones which have acidic olefinic units copolymerized therein. The conductivity measurements were carried out with a Maihak Conductivity Indicator as described previously. The test samples were stored in metal containers at room temperature and conductivity measurements carried out at stated intervals. The data in Table 5 also show that the conductivity of fuels treated with polysulfones containing acidic units increases with time.

TABLE 5

FUEL CONDUCTIVITY WITH POLYSULFONES CONTAINING ACID GROUPS
(Heptane and Jet Fuel - Base Conductivity = 0)

| Example No. | Polysulfone Composition | Conc. (ppm) | Fuel | Initial | 2 Days | 3 Days | 7 Days | 9 Days | 49 Days |
|---|---|---|---|---|---|---|---|---|---|
| 26 | 1-Octene/10-undecenoic Acid/SO$_2$(47.6/2.4/50) | 4 | n-Heptane | 110 | — | — | — | — | — |
| 27 | 1-Decene/Allylacetic Acid/SO$_2$(47.6/2.4/50) | 4 | Jet Fuel (JP-4) | 10 | — | — | 40 | — | — |
| 28 | 1-Decene/Maleic Anhy./SO$_2$ (45.5/4.5/50) | 4 | Jet Fuel (JP-4) | 10 | — | — | 40 | — | — |
| 29 | 1-Decene/Maleic Anhy./SO$_2$ (47.6/2.4/50) | 12 | Jet Fuel (JP-4) | 75 | 305 | — | — | 520 | 1000 |
| 30 | 1-Decene/Maleic Anhy./SO$_2$ (41.7/8.3/50) | 12 | Jet Fuel (JP-4) | 55 | 275 | — | — | 460 | 1000 |
| 31 | 1-Decene/Maleic Anhy./SO$_2$ (45.5/4.5/50) | 8 | Jet Fuel (JP-4) | 75 | 280 | — | — | 440 | 1000 |
| 32 | 1-Decene/Maleic Anhy./SO$_2$ (47.6/2.4/50) | 4 | n-Heptane | 20 | — | — | — | 380 | 980 |
| 33 | 1-Decene/Maleic Anhy./SO$_2$ (45.5/4.5/50) | 8 | n-Heptane | 10 | — | 215 | — | — | — |

EXAMPLES 34 TO 36

These Examples show the excellent separation from water of electrically conductive fuels of the invention containing polysulfones prepared by the method of Preparation 1. In the use of hydrocarbon fuels, particularly jet fuels, it is essential that after any contact with water, such hydrocarbon fuels separate themselves from water very rapidly. The test for water separation was carried out according to ASTM D2550-66T. In this test WSIM (Water Separation Index, Modified) is measured with ASTM-CRC Water Separometer, a device in which a fuel-water emulsion is prepared and metered through a cell containing a standardized glass fiber coalescer. The cell effluent turbidity, due to entrained water, is measured by light transmission through the fuel to a photocell. The output of the photocell is fed to a meter with a 0 to 100 scale, from which the numerical rating of the fuel is read. The higher the number, the more readily does the fuel release water. Usually WSIM rating of about 70 or higher is considered to be satisfactory. The results are shown below in Table 6.

TABLE 6

| | | WSIM Values | | |
|---|---|---|---|---|
| Ex. No. | Fuel | Additive | Conc. (ppm) | WSIM Rating |
| | Jet Fuel | None | — | 100 |
| 34 | Jet Fuel | 1-decene polysulfone | 8 | 98, 99, 99 |
| 35 | Jet Fuel | 1-decene polysulfone | 16 | 96, 97 |
| 36 | Jet Fuel | 1-decene polysulfone | 32 | 70 |

The results of Table 6 show that the olefin polysulfones utilized according to the invention do not interfere with the separation of the hydrocarbon fuels from water and since the olefin polysulfones are essentially insoluble in water, the polysulfone will remain in the hydrocarbon phase to continue to provide increased conductivity.

Discussion of U.S. Pat. No. 3,442,790

It is known from U.S. Pat. No. 3,442,790, Burkard et al., that wax-crystal modification of wax-containing oils is achieved by employing polysulfone in a concentration of at least 50 ppm. The patent is silent concerning any antistatic activity attributable to the polysulfone, at any concentration. It has been determined that the compositions of this invention, containing a maximum of 40 ppm of polysulfone, do not exhibit wax-crystal modification. Thus, two distinctions between the U.S. Pat. No. 3,442,790 teaching and the teaching of the instant invention are: (1) the U.S. Pat. No. 3,442,790, does not suggest antistatic behaviour of the compositions disclosed therein, (2) the U.S. Pat. No. 3,442,790 compositions contain wax-crystal modifying amounts of polysulfone, i.e. at least 50 ppm.

That the compositions of this invention do not contain amounts of polysulfone that are necessary for wax-crystal modification is demonstrated hereafter. It is pointed out first, however, that wax-crystal modification is evidenced (in accordance with the explanation offered in Example 2 of the U.S. Pat. No. 3,442,790) by a more rapid filtration rate for test oil containing the necessary amount of polysulfone than would be obtainable for the test oil containing no polysulfone.

A test oil mixture was made containing about 13 to 14 weight percent of wax corresponding to the test oil of Example 2 of the patent that contained 14 weight percent wax; one part of the test oil was then diluted with three parts of the same mixed solvent employed in Example 2 of the patent.

A portion of the test oil was then treated with 0.16 gram of a 2½% solution of a 1-decene polysulfone copolymer in kerosene per 100 grams of the test oil giving a concentration of polysulfone in test oil of 40 ppm.

Samples of the test oil, both treated (with polysulfone) and untreated were then warmed to 120° F. to dissolve the wax, and then cooled to −10° C. in an ice box; four runs were made in which 100 grams each of the treated and untreated samples were filtered according to the following procedure.

Both samples to be compared in each run were chilled simultaneously and then filtered through a chilled 150 ml coarse grade sintered glass funnel under house vacuum and the time required to obtain cracking in the wax bed so deposited was noted; on alternate runs the filtration apparatus was switched between the untreated sample (control) and the treated sample so that, on average, any differences were eliminated. Filtration times were as follows:

| Run 1 | Untreated Sample | 40 Sec. |
|---|---|---|

| | | |
|---|---|---|
| | Treated Sample | 48 Sec. |
| Run 2 | Untreated Sample | 9 Min. 0 Sec. |
| | Treated Sample | 9 Min. 38 Sec. |
| Run 3 | Untreated Sample | 3 Min. 5 Sec. |
| | Treated Sample | 3 Min. 20 Sec. |
| Run 4 | Untreated Sample | 2 Min. 37 Sec. |
| | Treated Sample | 3 Min. 25 Sec. |

These data show no decrease in filtration time caused by the addition of 40 ppm of the polysulfone.

The embodiments of the invention in which an exclusive property or privilege is claimed are defined as follows:

1. An electrically conductive hydrocarbon fuel composition comprising a normally liquid hydrocarbon fuel, and from 0.01 to 40 ppm of polysulfone copolymer, at an average molecular weight from about 10,000 to 900,000 effective to impart an antistatic property to said fuel consisting essentially of
   a. about 50 mol percent of units derived from sulfur dioxide,
   b. from about 40 to 50 mol percent of units derived from at least one 1-alkene having from 6 to 24 carbon atoms, and
   c. from 0 to about 10 mol percent of units derived from an olefin having the formula

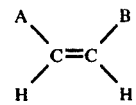

wherein A is a group having the formula, $-(C_xH_{2x})-COOH$, where $x$ is from 0 to 17, and B is hydrogen or carboxyl, with the proviso that when B is carboxyl, $x$ is 0, and A and B together can be a dicarboxylic anhydride group.

2. A composition according to claim 1 wherein the normally liquid hydrocarbon fuel boils in the range of from about 70° F to 700° F.

3. A composition according to claim 1 wherein the average molecular weight of the polysulfone copolymer is from about 50,000 to 700,000.

4. A composition according to claim 1 wherein the average molecular weight of the polysulfone copolymer is from about 100,000 to 500,000.

5. A composition according to Claim 1 wherein the polysulfone copolymer is 1-decene polysulfone.

* * * * *